United States Patent [19]

McElroy et al.

[11] 3,856,913
[45] Dec. 24, 1974

[54] COPPER EXTRACTION BY RAPID BACTERIOLOGICAL PROCESS

[75] Inventors: Roderick O. McElroy, Vancouver, British Columbia; Douglas W. Duncan, W. Vancouver, British Columbia, both of Canada

[73] Assignee: British Columbia Research Council, Vancouver, British Columbia, Canada

[22] Filed: Sept. 21, 1972

[21] Appl. No.: 290,950

[52] U.S. Cl. ............................ 423/27, 75/101 RB
[51] Int. Cl. ...... B01d 11/00, B01f 1/00, C01g 5/00, C01g 3/00, C01g 7/00
[58] Field of Search .......... 75/101 R, 103, 115, 117; 423/27, 28, 32, 41

[56] References Cited
UNITED STATES PATENTS

| | | | |
|---|---|---|---|
| 3,260,593 | 9/1962 | Zimmerley et al. | 75/117 |
| 3,266,889 | 4/1964 | Duncan et al. | 75/101 |
| 3,305,353 | 3/1964 | Duncan et al. | 75/101 |
| 3,347,661 | 10/1967 | Mayling | 75/101 |
| 3,433,629 | 3/1969 | Imai et al. | 75/101 |
| 3,455,679 | 7/1969 | Mayling | 75/101 |
| 3,607,235 | 9/1971 | Duncan et al. | 75/101 |
| 3,679,397 | 7/1972 | O'Connor et al. | 75/101 |

Primary Examiner—Oscar R. Vertiz
Assistant Examiner—Eugene T. Wheelock
Attorney, Agent, or Firm—Fetherstonhaugh & Co.

[57] ABSTRACT

Process for extracting high percentage of copper from ores and concentrates by bacteriological means by adding silver to the leaching medium.

13 Claims, 4 Drawing Figures

EFFECT OF ADDITION OF SILVER
IN THE MICROBIOLIGICAL LEACHING OF CHALCOPYRITE

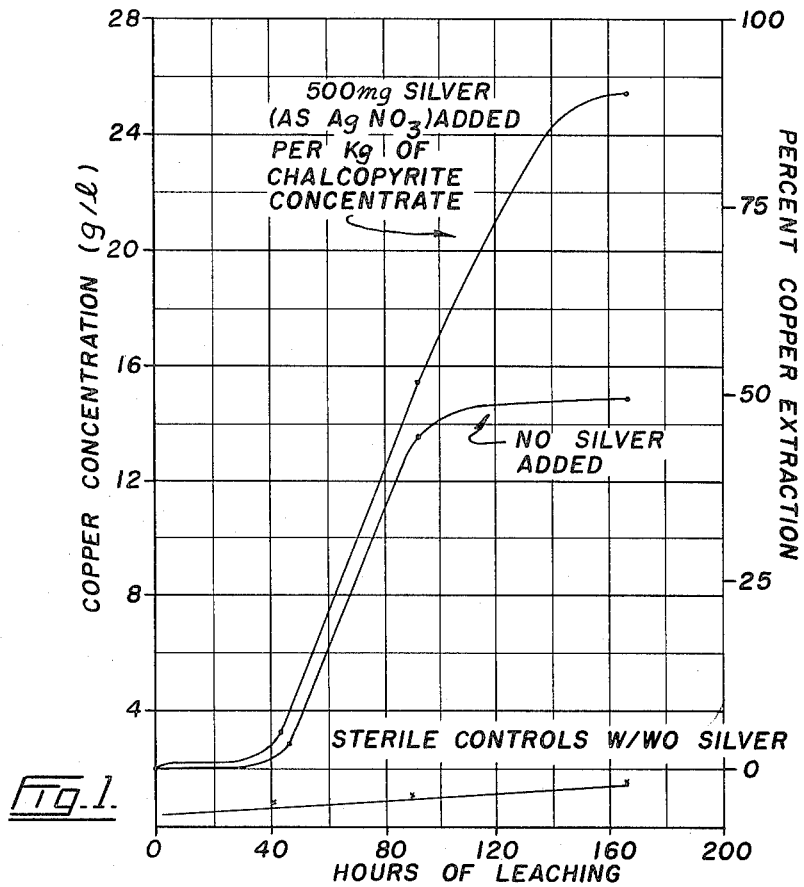
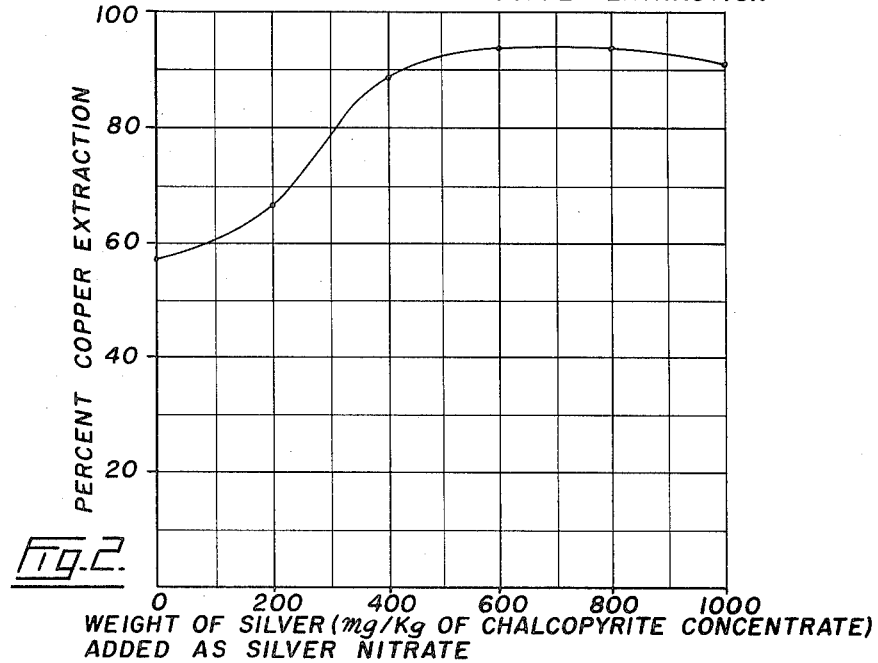

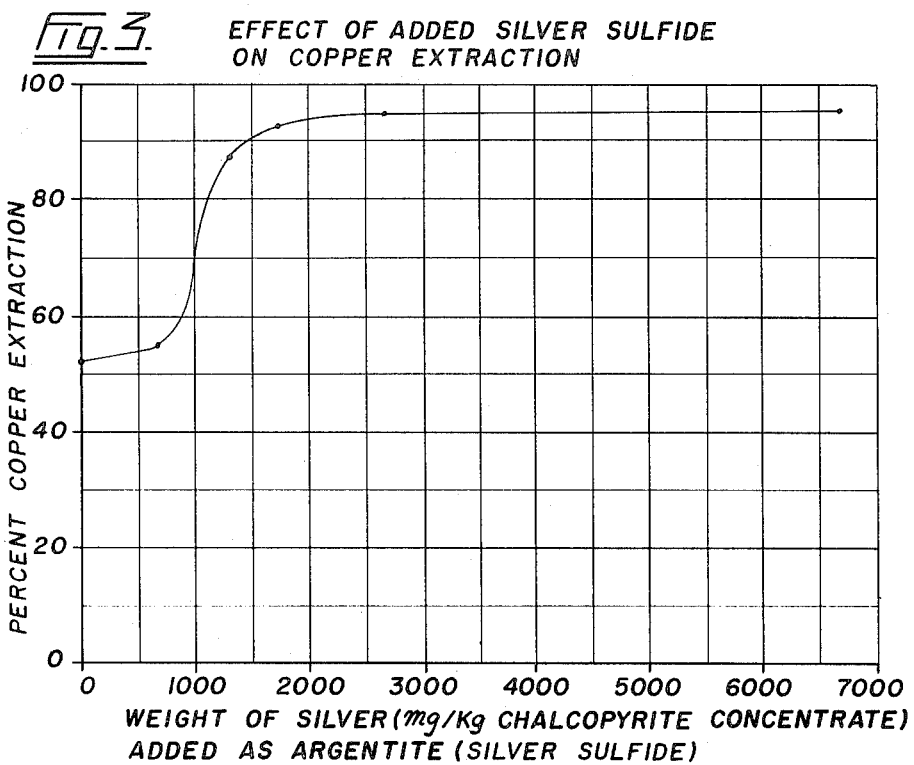
Fig. 3. EFFECT OF ADDED SILVER SULFIDE ON COPPER EXTRACTION
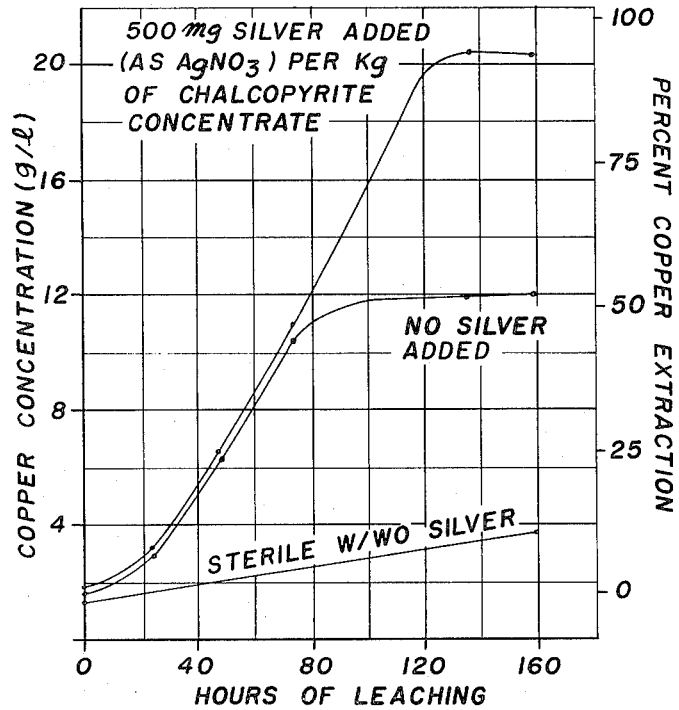
Fig. 4. EFFECT OF SILVER ON COPPER EXTRACTION FROM CHALCOPYRITE FROM A DIFFERENT SOURCE

COPPER EXTRACTION BY RAPID BACTERIOLOGICAL PROCESS

This invention relates to the rapid microbological extraction of copper from materials such as ores or concentrates containing chalcopyrite.

The leaching of metals from sulfide containing materials by bacteria such as *Thiobacillus ferrooxidans* has been known and carried out for many years, but rates of extraction were generally too slow for commercial application. U.S. Pat. No. 3,305,353, dated Feb. 21, 1967, discloses a process in which copper is released from chalcopyrite at a rate of 40 to 50 mg/l/hr. In the patented process, the ground ore or concentrate is pulped in an aqueous leaching medium containing sulfide-oxidizing bacteria while subjecting the ore, leaching medium and bacteria to agitation and aeration.

An improved microbiological leaching process is described in U.S. Pat. No. 3,607,235, dated Sept. 21, 1971. In this process, factors affecting the leaching rate have been optimized to produce copper release rates of up to 360 mg/l/hr, and these rates are high enough to be useful in commercial operation. In the process of the latter patent, the sulfide bearing material is treated in an aqueous acidic leaching medium containing sulfide-oxidizing bacteria and nutrient for the bacteria. The pulp is agitated and simultaneously aerated with air enriched by carbon dioxide.

In practical application of the process described in U.S. Pat. No. 3,607,235, from 50 to 80% of the copper initially present in chalcopyrite, the most important copper ore mineral, is extracted in a single stage of leaching. The remaining chalcopyrite is then separated from the leach residue by known methods, such as froth flotation, reground, and re-leached until the required extraction is achieved.

The present invention improves the process of U.S. Pat. No. 3,607,235, by providing significantly increased extraction of copper from materials containing chalcopyrite during any single stage of the leaching process.

The present invention contemplates the step of adding silver to the leaching pulp in a process for rapid bacteriological extraction of copper from particulate materials such as ores and concentrates containing chalcopyrite. The solid residue is removed from the pulping medium, and the silver recovered by well known recovery processes.

The process according to the present invention for rapid bacteriological extraction of copper from particulate materials containing chalcopyrite, comprises mixing said materials with a suitable aqueous acidic leaching medium containing sulfide oxidizing bacteria to make a pulp of a density of from about 2% to about 60% and having a pH of from about 1.5 to about 3.0, adding silver in finely divided or dissolved form to the mixture in the range of from about 200 to 7,000 milligrams of silver per kilogram of chalcopyrite containing material.

The present invention consists essentially of the addition of silver in the form of soluble or insoluble salts or as the metal to the leaching mixture. This addition may be made at the start of leaching or at any time thereafter, but is preferably made before the leach rate has slowed down or the pH of the leaching slurry has become unfavourably low for continued leaching. When silver is added as soluble or slightly soluble salts, such as silver nitrate, silver sulfate, or silver chloride the level of addition is preferably in the range of from about 500 to about 750 milligrams of silver per kilogram of chalcopyrite containing material, but may be in the range of from about 200 to about 1,000 mg/kg. When silver is added in the form of a highly insoluble salt, such as silver sulfide, the amount of added silver required to obtain a substantial increase in extraction may be higher, the range of silver addition in the form of silver sulfide being from about 700 to about 7,000 mg/Kg.

A process according to the present invention consists of making a pulp of a density of about 2% up to about 60% of chalcopyrite containing solids, in an aqueous acidic leaching medium, such as sulfuric acid, containing sulfide oxidizing bacteria, such as *Thiobacillus ferrooxidans* and nutrients for the bacteria. The pulp is preferably agitated and simultaneously aerated with air preferably enriched with carbon dioxide. Silver is added to the pulp, either as a salt or metal, in the range of from about 200 to about 7,000 mg of silver per kilogram of solid chalcopyrite bearing material. This mixture is subjected to agitation and aeration under conditions similar to those set out in U.S. Pat. No. 3,607,235. For example, the copper-containing material is ground to a particle size which is usually less than 325 mesh and preferably less than 400 mesh. Any suitable leaching medium may be used, such as, for example, a medium containing 3.0g of ammonium sulfate, 0.1g of potassium chloride, 0.5g of dipotassium hydrogen phosphate, 0.5g of magnesium sulfate heptahydrate, and 0.1 g of calcium nitrate per litre of water. The pH of the medium should be from about 2.5 to about 3.0, although values as low as 1.5 and as high as 3.5 can be used. This is an acidic solution which is compatible with the sulfide-oxidizing bacteria. In some instances, it may be desirable to add a surfactant, such as sorbitan polyoxyethylene monolaurate. The pulp is aerated wtih air preferably enriched with carbon dioxide so as to contain about 0.1% to about 10% of this gas.

The separation of pregnant (copper bearing) leach solutions from the silver-bearing leach residue is accomplished by well known processes, such as gravity settling and/or filtration. The copper dissolved in the leaaching medium is recovered by well known recovery processes, such as cementation, solvent extraction, electrowinning or precipitation as an insoluble salt.

The silver added to the leaching system remains primarily in the solid leach residue, and may be recovered for reuse by known methods, such as leaching with strong acids, chlorine or acid chloride solutions or leaching with cyanide salts or ammonia under basic conditions. Any silver in the leach solution can be largely recovered for re-use by contacting the solution with a small amount of unleached, ground sulfide material.

In the drawings,

FIG. 1 graphically illustrates the copper extraction obtained by the present method as compared to that obtained by the method of the prior art, FIG. 2 is a graph showing the effect of increasing additions of silver on the extraction of copper, FIG. 3 graphically illustrates the effect of adding silver as a highly insoluble sulfide, FIG. 4 graphically illustrates the effect of added silver on copper extraction from chalcopyrite of a different origin.

Silver is added to the pulp in the form of soluble or insoluble salts, or as finely divided metal. The level of silver added is preferably in the range of about 500 to about 1,000 mg/Kg of chalcopyrite containing solids but may be as low as about 200 mg/Kg or as high as required to obtain the desired increase in extraction. In practice, the level of silver addition is determined by such factors as fineness of grind, the desired increase in extraction, the characteristics of the chalcopyrite and the amount of chalcopyrite in the material being leached. When silver is added as a highly insoluble salt, such as silver sulfide, the level of addition is normally higher than the above range, and may be from 700 – 7,000 mg/Kg. The effects of adding silver as soluble and insoluble salts are illustrated in FIGS. 2 and 3. Depending on such factors as fineness of the grind, this addition of silver to the leach mixture normally increases copper extraction by 10 percent to 70 percent of the total copper over the extraction obtained by rapid biological leaching without addition of silver.

The results of variations in the present method are illustrated in the graphs of the drawings and in the following examples:

EXAMPLE 1

Duplicate 8.0 gram samples of chalcopyrite concentrate were leached in 75 ml of a nutrient medium containing 3.0 g/l $(NH_4)_2SO_4$, 0.1 g/l KCl, 0.5 g/l $K_2HPO_4$, 0.5 g/l $MgSO_4.7H_2O$, 0.1 g/l $Ca(No_3)_2$, and an active culture of Thiobacillus ferrooxidans, at an initial pH of 2.5. Silver nitrate was added initially to one sample at a level of 500 mg silver/Kg of chalcopyrite concentrate. Both samples were leached in baffled Erlenmeyer flasks at 35 C with agitation and aeration by means of a gyrotory shaker oscillating at 180 rpm. The atmosphere over the leaching samples was air enriched with 1% carbon dioxide. Duplicate sterile controls were treated in exactly the same manner except that no bacteria were added.

The leaching curves obtained are shown in FIG. 1. In the experiment with 500 mg/Kg of added silver, the final copper extraction was 88% compared to a final extraction of 50% in the experiment to which no silver was added. In the sterile controls 6% of the copper was extracted with or without silver being present.

The leaching medium contained sufficient chloride (as potassium chloride) to precipitate 90% of the added silver as silver chloride, so it is apparent that the presence of small amounts of chloride in the leach solution are not detrimental to the present process.

In a similar series of experiments, nutrient solution without chloride ion was used and silver was added (as silver nitrate) at various levels in the range 0 – 1,000 mg silver/Kg of chalcopyrite concentrate. The effect of added soluble silver on the extraction of copper from chalcopyrite is illustrated in the graph of FIG. 2.

EXAMPLE 2

A series of experiments using duplicate 8.0 g samples of chalcopyrite concentrate and 75 ml of nutrient medium (as in Example 1) were set up. To one control experiment, no silver was added. To other experiments, silver in the form of an argentite (silver sulfide) concentrate, was added in quantities equivalent to 0 – 7,000 mg silver/Kg of chalcopyrite concentrate. Leaching was under the same conditions as in Example 1. The effect on copper extraction of silver added as its sulfide is illustrated in the graph of FIG. 3. From these results it is apparent that addition of silver as the sulfide has an effect similar to that obtained by addition of silver as a soluble compound, but that a slightly higher level of silver addition may be required when silver is added in this form.

EXAMPLE 3

Duplicate 8.0 g samples of chalcopyrite concentrate from a different geographic source than the material used in the previous examples, were leached as in Example 1. In one experiment, silver was added (as silver nitrate) at a level of 500 mg/Kg of concentrate. Copper extraction was 92% in the experiment to which silver was added, compared to an extraction of 57% in the experiment without added silver. Without bacteria the extraction was 19% with or without silver. Leach curves from this experiment are shown in FIG. 4.

Several other chalcopyrite concentrates and ores from widely separated geographical areas have been biologically leached with and without added silver. In all cases, a significant increase in copper extraction was obtained by the addition of silver to the leaching slurry. Some typical results are as follows:

| Source | Percent Copper Extracted | | |
|---|---|---|---|
| | With 500 mg/Kg Silver | Without Silver | No Bacteria With or Without 500 mg/Kg silver |
| Chalcopyrite concentrate from Newfoundland | 67 | 53 | — |
| Chalcopyrite concentrate from Quebec | 76.4 | 51.5 | 10.6 |
| Chalcopyrite concentrate from Austria | 57 | 44 | 4.2 |
| Chalcopyrite concentrate from Arizona | 80.8 | 51.4 | 5.8 |
| Chalcopyrite concentrate from Wyoming | 91.6 | 61.9 | 21.3 |
| Chalcopyrite ore from British Columbia | 91 | 19 | 7 |
| Chalcopyrite ore from the Philippines | 100 | 29 | 4 |

We claim:

1. In a process for rapid bacteriological extraction of copper by leaching from particulate materials in pulp form of a density of from about 2 to about 60% such as ores and concentrates containing chalcopyrite in an aqueous acidic leaching medium containing sulfide oxidizing bacteria and a nutrient for said bacteria and under agitation and aeration with air enriched with carbon dioxide, the step which comprises adding silver to said leaching pulp, said silver being in an amount of at least about 200 mg/Kg of solid material.

2. In a process for rapid bacteriological extraction of copper by leaching from particulate materials in pulp form of a density of from about 2% to about 60% such as ores and concentrates containing chalcopyrite in an aqueous acidic leaching medium containing sulfide oxidizing bacteria and a nutrient for said bacteria and under agitation and aeration with air enriched with carbon dioxide, the steps which comprise adding silver to said pulp, said silver being in an amount of at least about 200 mg/Kg of solid material, leaching out the copper, then removing the solid residue from the pulping medium, recovering the copper from the leaching medium, and recovering the silver from the removed solid residue.

3. The process for rapid bacteriological extraction of copper from particulate materials containing chalcopyrite, which comprises mixing said material with a suitable aqueous acidic leaching medium containing sulfide oxidizing bacteria to make a pulp of a density of from about 2% to about 60% and containing sufficient sulfuric acid to maintain a pH of from about 1.5 to about 3.5, adding silver in finely divided or soluble form to the mixture in the range of from about 200 to 7,000 milligrams of silver per kilogram of chalcopyrite containing material, leaching out the copper, separating solids and the leaching medium, and recovering copper dissolved in the leaching medium.

4. The process as claimed in claim 3 in which the silver is added in the form of a silver salt selected from the group consisting of silver nitrate, silver sulfate or silver chloride.

5. The process as claimed in claim 3 in which the silver is added in the form of silver sulfide or naturally occuring silver sulfides such as argentite.

6. The process as claimed in claim 2 in which the silver is added as soluble or insoluble salts in the range of from about 200 to about 1,000 milligrams of silver per kilogram of chalcopyrite containing material.

7. The process as claimed in claim 6 in which the silver salt is selected from the group consisting of silver nitrate, silver sulfate or silver chloride.

8. The process as claimed in claim 2 in which the silver is added as soluble or slightly soluble salts in the range of from about 500 to 750 milligrams of silver per kilogram of chalcopyrite containing material.

9. The process as claimed in claim 8 in which the silver salt is selected from the group consisting of silver nitrate, silver sulfate or silver chloride.

10. The process as claimed in claim 2 in which the silver is added as a highly insoluble salt or finely divided metal in the range of from about 700 to about 7,000 milligrams of silver per kilogram of chalcopyrite containing material.

11. The process as claimed in claim 10 in which the silver salt is silver sulfide or naturally occuring silver sulfides such as argentite.

12. The process as claimed in claim 3 including agitating the pulp to suspend the particles in the medium and simultaneously aerating the pulp with air enriched with carbon dioxide.

13. The process for rapid bacteriological extraction of copper from particulate materials containing chalcopyrite, which comprises grinding said materials to a size normally less than about 325 mesh and preferably less than about 400 mesh, mixing the ground material in an aqueous acidic leaching medium to make a pulp of a density from about 2% to about 60% and containing a sulfide-oxidizing bacteria and a nutrient for said bacteria and containing sufficient sulfuric acid to maintain a pH of about 1.5 to about 3.5, agitating the pulp, aerating the pulp with air enriched with carbon dioxide, adding silver in the form of soluble or insoluble salts or as finely divided metal in the range of from about 200 to about 7,000 mg/Kg of solid material, leaching the copper, separating the leaching medium and the solids, and recovering silver from said leaching medium and said solids.

* * * * *